(12) United States Patent
deKoninck et al.

(10) Patent No.: US 11,073,531 B2
(45) Date of Patent: Jul. 27, 2021

(54) VERTICAL THERMAL GRADIENT COMPENSATION IN A Z-AXIS MEMS ACCELEROMETER

(71) Applicant: INVENSENSE, INC., San Jose, CA (US)

(72) Inventors: David deKoninck, Brossard (CA); Varun Subramaniam Kumar, San Jose, CA (US); Matthew Julian Thompson, Beaverton, OR (US); Vadim Tsinker, Belmont, CA (US); Logeeswaran Veerayah Jayaraman, Milpitas, CA (US); Sarah Nitzan, Palo Alto, CA (US); Houri Johari-Galle, San Jose, CA (US); Jongwoo Shin, Pleasanton, CA (US); Le Jin, Fremont, CA (US)

(73) Assignee: INVENSENSE, INC., San Jose, CA (US)

( * ) Notice: Subject to any disclaimer, the term of this patent is extended or adjusted under 35 U.S.C. 154(b) by 15 days.

(21) Appl. No.: 16/547,268

(22) Filed: Aug. 21, 2019

(65) Prior Publication Data
US 2021/0055321 A1   Feb. 25, 2021

(51) Int. Cl.
*G01P 1/00*   (2006.01)
*G01P 15/125*   (2006.01)

(52) U.S. Cl.
CPC .......... *G01P 1/006* (2013.01); *G01P 15/125* (2013.01)

(58) Field of Classification Search
CPC .................................................... G01P 1/006
USPC .......................................................... 73/497
See application file for complete search history.

(56) References Cited

U.S. PATENT DOCUMENTS

| 6,959,583 B2 | 11/2005 | Platt |
| 8,358,296 B2 | 1/2013 | Anderson |
| 9,191,012 B2 | 11/2015 | Hsieh |
| 9,429,491 B2 | 8/2016 | Bemis |
| 9,523,619 B2 | 12/2016 | DeRosa |
| 10,024,880 B2 | 7/2018 | Stoops |
| 10,060,803 B2 | 8/2018 | Nakagawa |

(Continued)

OTHER PUBLICATIONS

International Search Report and Opinion for PCT/US2020/043573 dated Nov. 2, 2020 (13 pages).

*Primary Examiner* — Walter L Lindsay, Jr.
*Assistant Examiner* — Philipmarcus T Fadul
(74) *Attorney, Agent, or Firm* — Haley Guiliano LLP; Joshua V. Van Hoven; Stefan Osterbur

(57) ABSTRACT

A microelectromechanical (MEMS) accelerometer has a proof mass and a fixed electrode. The fixed electrode is located relative to the proof mass such that a capacitance formed by the fixed electrode and the proof mass changes in response to a linear acceleration along a sense axis of the accelerometer. The MEMS accelerometer is exposed to heat sources that produce a z-axis thermal gradient in MEMS accelerometer and an in-plane thermal gradient in the X-Y plane of the MEMS accelerometer. The z-axis thermal gradient is sensed with a plurality of thermistors located relative to anchoring regions of a CMOS layer of the MEMS accelerometer. The configuration of the thermistors within the CMOS layer measures the z-axis thermal gradient while rejecting other lateral thermal gradients. Compensation is performed at the accelerometer based on the z-axis thermal gradient.

20 Claims, 4 Drawing Sheets

(56) References Cited

U.S. PATENT DOCUMENTS

| | | |
|---|---|---|
| 2005/0152015 A1 | 7/2005 | Anderson |
| 2006/0245034 A1 | 11/2006 | Chen |
| 2009/0084177 A1 | 4/2009 | Ao |
| 2010/0078753 A1 | 4/2010 | Mehregany |
| 2013/0085699 A1 | 4/2013 | Touchberry |
| 2013/0186171 A1 | 7/2013 | Merrill, Jr. |
| 2014/0208823 A1* | 7/2014 | Trusov .................... G01P 21/00 73/1.38 |
| 2014/0250969 A1 | 9/2014 | Alagarsamy |
| 2016/0128193 A1 | 5/2016 | Duncan |
| 2017/0343443 A1 | 11/2017 | VanDeWeert |
| 2018/0038921 A1 | 2/2018 | Parsa |
| 2018/0283956 A1* | 10/2018 | Van Buggenhout ...... G01J 5/06 |
| 2019/0165759 A1* | 5/2019 | Nishizawa ............... H03H 9/19 |
| 2020/0049539 A1 | 2/2020 | De Luca |

* cited by examiner

VERTICAL THERMAL GRADIENT COMPENSATION IN A Z-AXIS MEMS ACCELEROMETER

BACKGROUND

Numerous items such as smartphones, smart watches, tablets, automobiles, aerial drones, appliances, aircraft, exercise aids, and game controllers utilize sensors during their operation (e.g., motion sensors, pressure sensors, temperature sensors, etc.). In commercial applications, microelectromechanical (MEMS) devices or sensors such as accelerometers and gyroscopes capture complex movements and determine orientation or direction. For example, smartphones are equipped with accelerometers and gyroscopes to augment navigation systems that rely on Global Position System (GPS) information. In another example, an aircraft determines orientation based on gyroscope measurements (e.g., roll, pitch, and yaw) and vehicles implement assisted driving to improve safety (e.g., to recognize skid or roll-over conditions).

Sensors are often one component of a larger system, and with the desire for commercial devices to become more integrated and compact, this larger system is packaged within an end-use device that may itself be compact (e.g., a smartphone). As the density of chips, microelectromechanical devices, and other components increases, these components and environment conditions of the external environment such as electromagnetic emissions, physical shocks, and exposure to temperature impact the operating conditions for the MEMS device.

SUMMARY

In some embodiments of the present disclosure, a microelectromechanical (MEMS) accelerometer for measuring linear acceleration along a measurement axis comprises a MEMS layer having a bottom planar surface and a CMOS layer having an upper planar surface parallel to the bottom planar surface of the MEMS layer, wherein a gap is defined between the upper planar surface of the CMOS layer and the bottom planar surface of the MEMS layer. The MEMS accelerometer may also comprise a first anchor located within the gap and attached to each of the MEMS layer and the CMOS layer, wherein the attachment of the first anchor to the CMOS layer defines a first anchoring region, and a second anchor located within the gap and attached to each of the MEMS layer and the CMOS layer, wherein the attachment of the second layer to the CMOS layer defines a second anchoring region. The MEMS accelerometer may also comprise four temperature sensors located within a first plane within the CMOS layer, comprising a first temperature sensor located below the first anchoring region, wherein the first plane is perpendicular to the measurement axis, a second temperature sensor located below the second anchoring region, wherein the first temperature sensor and the second temperature sensor are located along a first axis and are equidistant from a center point along the first axis, a third temperature sensor located at a location that is not under either the first anchoring region or the second anchoring region, and a fourth temperature sensor located at a location that is not under either the first anchoring region or the second anchoring region, wherein the third temperature sensor and the fourth temperature sensor are located along a second axis that is orthogonal to the first axis and are equidistant from the center point. The MEMS accelerometer may also comprise processing circuitry configured to generate a first signal in response to a thermal gradient perpendicular to the first plane by combining outputs of the first temperature sensor, second temperature sensor, third temperature sensor, and fourth temperature sensor. The processing circuitry of the MEMS accelerometer may also be configured to generate a second signal including a first component corresponding to movement of a portion of the MEMS layer along the measurement axis relative to the CMOS layer in response to the thermal gradient and a second component corresponding to movement of the portion of the MEMS layer along the measurement axis relative to the CMOS layer in response to linear acceleration along the measurement axis. The processing circuitry may also be configured to generate a linear acceleration output signal based on the first signal and the second signal, wherein the first signal compensates for the first component of the second signal such that the linear acceleration corresponds to the second component of the second signal.

In some embodiments of the present disclosure, a method of measuring linear acceleration along a measurement axis for a microelectromechanical (MEMS) device comprises receiving, from a first temperature sensor located in a CMOS layer below a first anchoring region, a first temperature signal, wherein a first anchor defines the first anchoring region and is coupled between the CMOS layer and a MEMS layer within a gap between the CMOS layer and the MEMS layer. The method may also comprise receiving, from a second temperature sensor located in the CMOS layer below a second anchoring region, a second temperature signal, wherein a second anchor defines the second anchoring region, the second anchor is coupled between the CMOS layer and the MEMS layer within the gap between the CMOS layer and the MEMS layer. The method may also comprise receiving, from a third temperature sensor located at a first location that is not under either the first anchoring region or the second anchoring region, a third temperature signal and receiving, from a fourth temperature sensor located at a second location that is not under either the first anchoring region or the second anchoring region, a fourth temperature signal. The method may also comprise generating a first output signal in response to a thermal gradient perpendicular to a first plane by combining outputs of the first temperature sensor, second temperature sensor, third temperature sensor, and fourth temperature sensor, wherein the first temperature sensor, second temperature sensor, third temperature sensor, and fourth temperature sensor are located within a first plane within the CMOS layer. The method may also comprise generating a second output signal corresponding to movement of a portion of the MEMS layer along the measurement axis relative to the CMOS layer in response to the thermal gradient and a second component corresponding to movement of the portion of the MEMS layer along the measurement axis relative to the CMOS layer in response to linear acceleration along the measurement axis. The method may also comprise generating a linear acceleration output signal based on the first signal and the second signal, wherein the first signal compensates for the first component of the second signal such that the linear acceleration corresponds to the second component of the second signal.

BRIEF DESCRIPTION OF THE DRAWINGS

The above and other features of the present disclosure, its nature, and various advantages will be more apparent upon consideration of the following detailed description, taken in conjunction with the accompanying drawings in which.

DETAILED DESCRIPTION OF DRAWINGS

Figure 1:
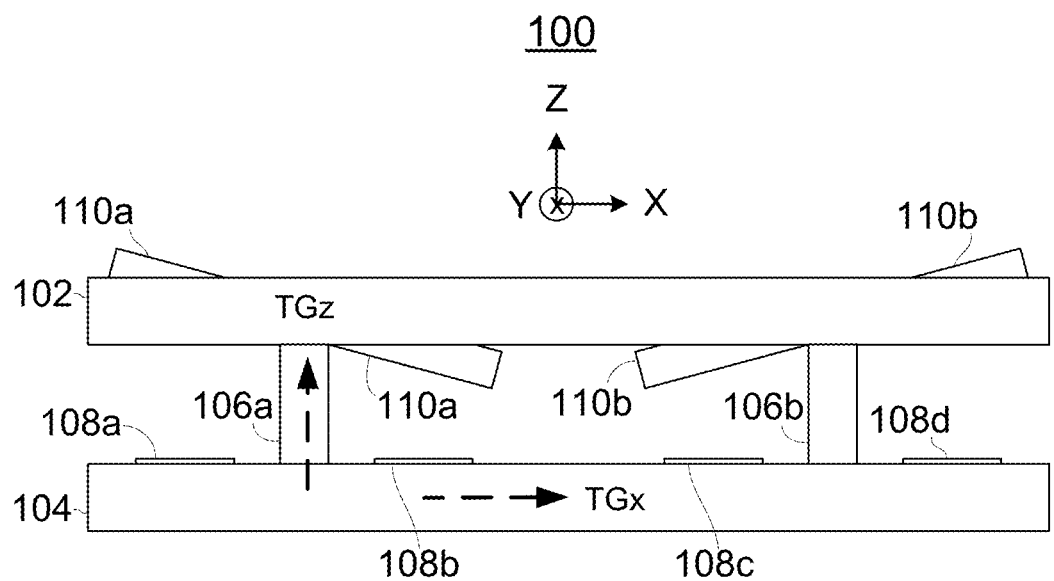
FIG. 1 shows a side view of an illustrative MEMS accelerometer having movable proof masses and fixed electrodes in accordance with some embodiments of the present disclosure.

A z-axis MEMS accelerometer may include a MEMS layer and a CMOS layer that are bonded with other layers (e.g., a cap layer above the MEMS layer, which is above the CMOS layer) to form a cavity. The MEMS layer is patterned to include a suspended spring-mass system located within the cavity and that is configured such that proof masses of the spring-mass system move relative to the CMOS layer in response to linear acceleration along the z-axis. The movement of the proof masses of the MEMS layer in response to linear acceleration is sensed by electrodes patterned on the CMOS layer, which form a capacitor having a capacitance that changes based on the distance between the proof masses and the electrodes.

Heat sources from adjacent components (e.g., processors, power sources, transponders, etc.) or from the external environment may cause heat transfer to a portion of the MEMS sensor. When this heat transfer generates a thermal gradient along the z-axis, air pressure within the cavity may become unbalanced, based on the different relative temperatures at different portions of the cavity. This may cause the proof masses to move a fixed distance (e.g., corresponding to the pressure differential) relative to the electrodes, resulting in an offset in the sensed capacitance. This offset is unrelated to linear acceleration and may reduce the accuracy of linear acceleration measurements.

In some embodiments of the present disclosure, the MEMS layer is parallel to the CMOS layer and is attached to the CMOS layer by anchors that extend perpendicular to the MEMS and CMOS layers within a gap of a portion of the cavity that is located between the MEMS and CMOS layers. Because the anchors create a direct physical connection between the MEMS and CMOS layers, heat transfer between the MEMS and CMOS layers in response to heat sources (e.g., z-axis thermal gradient) is relatively large at anchoring regions where the MEMS and CMOS layers are physically bonded to the anchors. Heat is transferred between the MEMS and CMOS layers via the anchors and disperses outwards within the MEMS or CMOS layer from the anchoring regions. Other modes of heat transfer between the MEMS and CMOS layer (e.g., via the air gaps or external packaging) may be relatively minimal compared to the heat transfer via the anchor.

In some embodiments of the present disclosure a thermistor may be located within a plane of the CMOS layer below each of the anchoring regions and additional thermistors may be located within the plane of the CMOS layer remote from the anchoring regions. The temperature differences measured between the locations may correspond to the dispersion of heat from the anchoring regions which in turn corresponds to thermal gradient between the MEMS layer to the CMOS layer. Different degrees of thermal gradient may in turn correspond to a different degree of offset in the location in the proof mass due to thermal gradient. In order to capture the z-axis thermal gradient that is relevant to z-axis proof mass offset, the thermistors may be located and configured such that other thermal gradients (e.g., in-plane within the CMOS layer) are rejected. Based on a correspondence between the z-axis thermal gradient and the offset, compensation may be applied to more accurately capture the actual z-axis linear acceleration in the presence of a z-axis thermal gradient.

FIG. 1 shows a side view 100 of a portion of an illustrative MEMS accelerometer having movable proof masses 110a and 110b and fixed electrodes 108a, 108b, 108c, and 108d in accordance with some embodiments of the present disclosure. Components may not be depicted to scale for ease of illustration.

The illustrative MEMS accelerometer comprises MEMS layer 102, CMOS layer 104, and anchors 106a and 106b separating and located within a gap between the two layers. Packaging and additional layers (e.g., cap layer) are not shown in FIG. 1 for ease of illustration but may be coupled to the MEMS layer 102 and/or CMOS layer 104 to form a hermetically sealed cavity in which the movable MEMS components (e.g., proof masses 110a and 110b, and springs and/or masses coupled thereto) are able to move. The cavity may have a nominal pressure. In the exemplary embodiment of FIG. 1, a bottom plane of the suspended spring-mass system of the MEMS layer 102 is located parallel to an upper plane of the CMOS layer 104 and the electrodes 108a-108d located thereon.

Anchors 106a and 106b extend between CMOS layer 104 and MEMS layer 102, and in the embodiment of FIG. 1, may extend such that the anchors 106a and 106b are perpendicular to each of CMOS layer 104 and MEMS layer 102. MEMS layer 102 may include a suspended spring mass system including proof masses 110a and 110b, which are suspended from anchors 106a and 106b, respectively, by interconnected springs and/or masses (not visible in FIG. 1). The components of the suspended spring mass system are sized and configured in a manner to facilitate movement of the proof masses 110a and 110b in response to an inertial force to be measured, e.g., linear acceleration in the direction of the z-axis.

Proof mass 110a is suspended over electrodes 108a and 108b and proof mass 110b is suspended over electrodes 108c and 108d. In response to a z-axis linear acceleration experienced by the MEMS accelerometer (e.g., due to movement of a device including the MEMS accelerometer) the proof masses 110a and 110b rotate out of the plane of the MEMS layer (e.g., about the y-axis) such that portions of the proof mass move closer to or farther away from respective electrodes, with the direction of the rotation based on whether the linear acceleration is in the positive z-axis or negative z-axis, and with the degree of rotation (e.g., how much the proof masses move with respect to the respective electrodes) based on the magnitude of the acceleration. The z-axis of the linear acceleration that causes the movement of the proof masses may also be referred to as a measurement axis. The design of the suspended spring mass system may be such that the proof masses 110a and 110b have minimal movement out of plane in response to acceleration in directions other than linear acceleration in the direction of the z-axis.

The movement of the proof masses 110a and 110b out of the MEMS layer plane may be sensed using electrostatic sensing as depicted in FIG. 1. Fixed electrodes 108a, 108b, 108c, and 108d are located parallel to the proof masses (e.g., on CMOS layer 104 below proof masses 110a and 110b) to form capacitors with portions of the proof masses (e.g., electrode 108a forms a capacitor with a first portion of proof mass 110a, electrode 108b forms a capacitor with a second portion of proof mass 110a, electrode 108c forms a capacitor with a first portion of proof mass 110b, and electrode 108d forms a capacitor with a second portion proof mass 110b). The capacitance of each of the proof masses may change based on the relative distance between each proof mass portion and its associated sense electrodes. The capacitances are used by processing circuitry in the CMOS layer 104 to determine linear acceleration.

Figure 2:
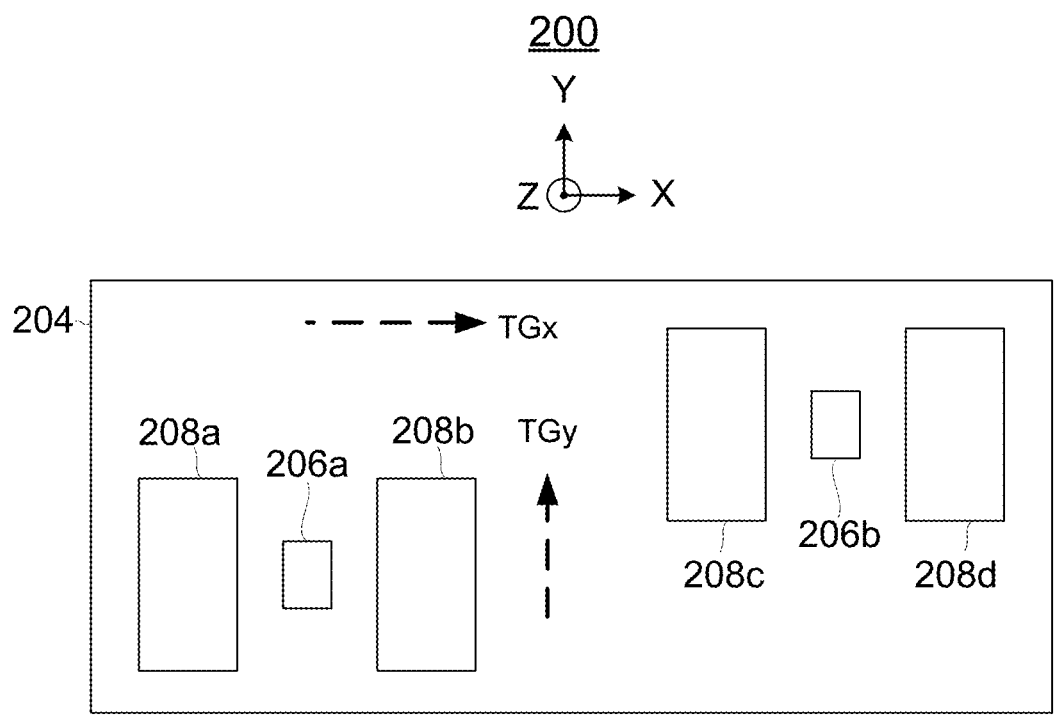
FIG. 2 shows a top view of an illustrative CMOS layer of the MEMS accelerometer of FIG. 1 having two anchoring regions in accordance with some embodiments of the present disclosure.

FIG. 2 shows top view 200 of an illustrative CMOS layer 204 of the accelerometer of FIG. 1 having two anchoring regions 206a and 206b in accordance with some embodiments of the present disclosure. Components may not be depicted to scale for ease of illustration. FIG. 2 is a top view of the CMOS layer 104 of the accelerometer depicted in FIG. 1, as exemplified by the reference axes depicted. In top view 200, CMOS layer 204 corresponds to CMOS layer 104, anchoring regions 206a and 206b correspond to locations for anchors 106a and 106b, and electrodes 208a-208d correspond to electrodes 108a-108d.

The accelerometer may be exposed to heat sources at a variety of locations. In some instances, the accelerometer is located next to circuitry that heavily consumes power and as a result, is exposed to the heat generated by the circuitry. This thermal gradient applied to the accelerometer is depicted in FIG. 2 as having an x-component "TGx" in the positive x-axis direction and a y-component "TGy" in the positive y-axis direction. Though not depicted in FIG. 2, a z-component of the thermal gradient may exist, as depicted in FIG. 1. These thermal gradient components are not limited to these three directions and quantities, and the thermal gradient experienced by CMOS layer 204 may comprise a multitude of thermal gradient vectors of varying magnitude and directions. In some instances, the heat source may be located relatively closer to an upper portion of the MEMS accelerometer, such that z-axis heat transfer within the MEMS acceleration is in the direction of CMOS layer 204/104 from the MEMS layer 102, causing a thermal gradient in the negative z-direction. With respect to the CMOS layer 204, the heat transfer due to the z-axis thermal gradient is greatest in magnitude at anchoring regions 206a and 206b and disperses throughout CMOS layer 204. The thermal gradient with components in only the x-axis and y-axis is referred to herein as the "lateral thermal gradient." A "thermal gradient" as referred to herein may be defined as a change in temperature across a unit distance or a combination of changes in temperature over distance. CMOS layer 204 may experience a thermal gradient that comprises multiple thermal gradient vectors corresponding to direction of dispersion from the heat source(s). The thermal gradient experienced by the sensor is dependent on the magnitude of the external heat source, frequency of exposure, duration of exposure, any suitable factor affecting a change in thermal gradient, or any combination thereof.

A thermal gradient may alter the offset and sensitivity of the MEMS accelerometer. Operation of the MEMS accelerometer depends on movement of the physical components and measurement of the accelerometer is taken in reference to a reference state. Thermal gradients may create Knudsen forces and non-homogenous changes in air pressure, e.g., based on different temperatures and pressures within the cavity. The creation of Knudsen forces may cause suspended components of the accelerometer such as proof masses 110a and 110b to move absent any applied linear acceleration (e.g., the proof masses move to a new reference state when the accelerometer is supposed to be in a reference state and stationary). The changes in air pressure may cause a similar movement to the suspended proof masses because forces result from the air pressure that are applied to the proof masses. Movement of the proof masses during reference state is undesired because it adds a component to the measured acceleration output that is not due to z-axis acceleration. When the reference state capacitance between a portion of a proof mass and an electrode is a known value, the unknown linear acceleration is determined using this known value and a change in capacitance from the known value. On the other hand, when Knudsen forces or other changes to the location of the proof masses relative to the electrodes due to thermal gradients skew the reference state capacitance value, the accuracy of the determination of linear acceleration is affected.

One component of the thermal gradient that is of primary concern is the thermal gradient component in the z-axis. The z-axis thermal gradient (e.g., "TGz" as depicted in FIG. 1) is experienced by the accelerometer throughout the cavity and gap between the MEMS layer (not depicted in FIG. 2) and CMOS layer 204. The z-axis thermal gradient may correspond to Knudsen forces and forces from changing air pressure within the cavity and gap. These effects of the z-axis thermal gradient cause an undesired capacitance to be measured in addition to capacitance caused by linear acceleration forces.

Figure 3:
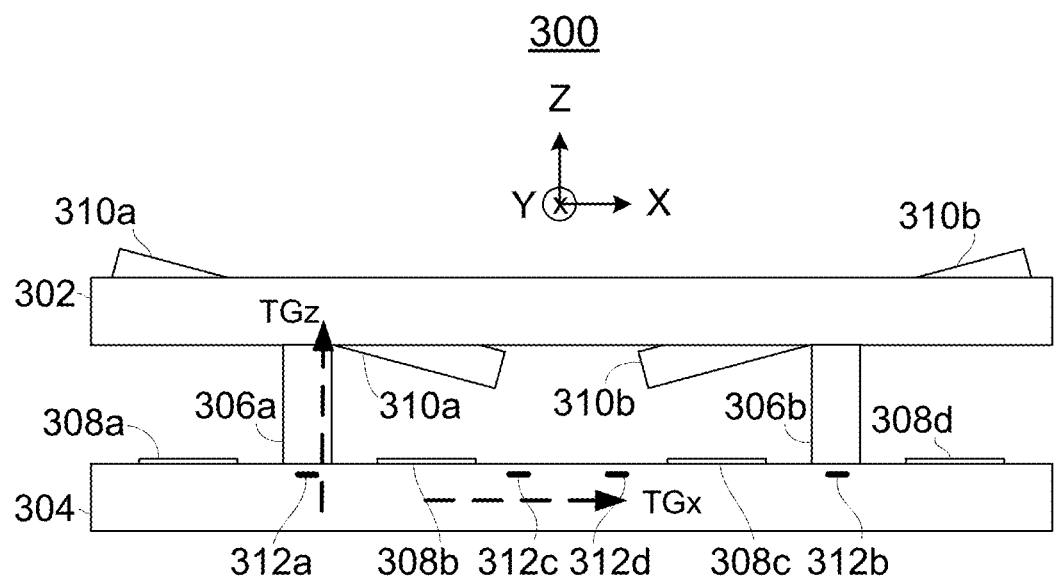
FIG. 3 shows a side view of an illustrative MEMS accelerometer having movable proof masses, fixed electrodes, and temperature sensors in accordance with some embodiments of the present disclosure.

FIG. 3 shows a side view 300 of an illustrative MEMS accelerometer having movable proof masses 310a and 310b, fixed electrodes 308a-d, and thermistors 312a-d in accordance with some embodiments of the present disclosure. Components may not be depicted to scale for ease of illustration.

Thermistors placed within a plane of the CMOS layer facilitate estimation of the z-axis thermal gradient. Thermistors 312a-d are placed in a common plane of the varying component planes of CMOS layer 304. Within the component plane, the thermistors are placed at different relative locations along the X and Y axes. Thermistors 312a and 312b are located directly under the anchors 306a and 306b, which provide a direct path for heat transfer between MEMS layer 302 and CMOS layer 304 (i.e., z-axis thermal gradients). Z-axis thermal gradients, as discussed in the description of FIG. 2, cause issues for the accuracy of MEMS z-axis accelerometer measurements by causing an undesirable offset of the proof masses 310a-b along the z-axis relative to the electrodes 308a-d.

The thermistors 312a and 312b may have different temperatures despite a similar z-axis thermal gradient. For example, thermistors 312a and 312b may also be affected by lateral thermal gradients within the CMOS plane 304 such as x-axis thermal gradient TGx, y-axis thermal gradient TGy, or an in-plane thermal gradient having both x-axis and y-axis components.

Because thermistors 312c and 312d are located away from the anchors 306a and 306b, temperatures measured by them are impacted by dispersion of heat from anchors 306a and 306b through CMOS layer 304, as well as other lateral thermal gradients within the CMOS plane 304 such as x-axis thermal gradient TGx, y-axis thermal gradient TGy, or an in-plane thermal gradient having both x-axis and y-axis components. For example, in addition to heat transfer along the z-axis from the MEMS layer through the anchors 306a and 306b and dispersion of that heat in-plane as a lateral thermal gradient, the CMOS layer 304 may also experience heat transfer due to an adjacent heat source that also creates a lateral thermal gradient. As described herein, the primary concern for the z-axis MEMS-accelerometer may be z-axis thermal gradients. Accordingly, as described herein, the thermistors 312a-312d may be located at respective locations within the x-y plane of the CMOS layer 304 in order to reject the effect of lateral thermal gradients due to lateral heat sources (and lateral thermal gradients caused by dispersion from anchors 306a and 306b) while isolating only the z-axis thermal gradient.

Figure 4:
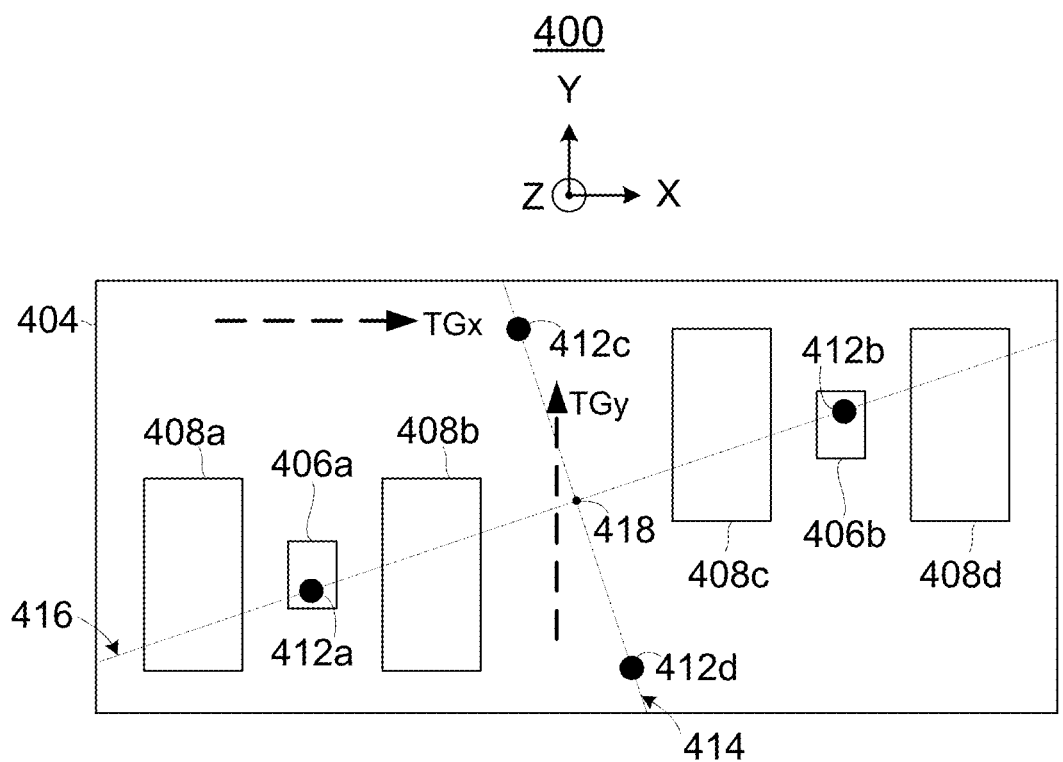
FIG. 4 shows a top view of an illustrative CMOS layer of the MEMS accelerometer of FIG. 3 having two anchor regions and temperature sensors in accordance with some embodiments of the present disclosure.

FIG. 4 shows top view 400 of illustrative CMOS layer 404 of a MEMS accelerometer having two anchor regions 406a and 406b and selectively located thermistors 408a-d in accordance with some embodiments of the present disclosure. Components may not be depicted to scale for ease of illustration. FIG. 4 is a top view of the CMOS layer 304 of the accelerometer depicted in FIG. 3, as exemplified by the reference axes depicted. In top view 400, CMOS layer 404 corresponds to CMOS layer 304, anchoring regions 406a and 406b correspond to locations for anchors 306a and 306b, and electrodes 408a-408d correspond to electrodes 308a-308d.

Thermistors 412a-d are placed within CMOS layer 404 on a common layer and on different points on the X and Y axes. Though thermistors are depicted in FIG. 4 as appearing on the surface of the CMOS layer, they are within CMOS layer 404. Thermistors 412a and 412b are placed close to (e.g., below) the anchors at anchoring regions 406a and 406b. Anchoring regions 406a and 406b are a thermal path for the out-of-plane z-axis thermal gradient causing heat transfer between the MEMS layer 302 and the CMOS layer 304/404 in the out-of-page direction (e.g., a thermal gradient in the direction opposite arrow TGz as depicted in FIG. 3). The placement of thermistors 412a and 412b allow temperature measurements at the regions of CMOS layer 404 that receive the greatest heat transfer from the MEMS layer. Thermistors 412c and 412d are placed away from anchoring regions 406a and 406b. The placement of thermistors 412c and 412d allow temperature measurements at the regions of CMOS layer 404 that receive heat transfer from the MEMS layer indirectly through dispersion from anchoring regions 406a and 406b. The thermistors may also be subject to strain effects, for example, from stresses put on the MEMS packaging during operation. These strain effects may impact the response of the thermistors to temperature, for example, causing a proportional increase or decrease in the thermistor value in response to a give temperature due to different induced strains experienced by the thermistors.

In an embodiment, thermistors 412a-d are located at specific relative locations in order to reject lateral thermal gradients due to lateral heat sources, and also to counteract any changes in thermistor response due to any induced strain effects. The thermistors 412c and 412d may be located at equivalent distances respective to associated thermistor 412a (associated with thermistor 412c) and thermistor 412b (associated with thermistor 412d). The thermistors 412a-412d are further placed about a center point within the CMOS layer with respect to the anchoring regions 406a and 406b, along orthogonal axes 414 (for thermistors 412c and 412d) and 416 (for thermistors 412a and 412b). Thermistors 412a-d are placed about center point 418 on orthogonal axis 414 and 416. Thermistors 412a and 412b and thermistors 412c and 412d are equidistant in pairs. In particular, a first distance between thermistor 412a and center point 418 and is the same distance between thermistor 412b and center point 418. A second distance between thermistor 412c and center point 418 and is the same distance between thermistor 412d and center point 418, though may be different from the first distance. The orthogonal arrangement of thermistors is further associated with a bridge circuit configuration of the thermistors as described below. The thermistors are symmetric to one another within the orthogonal axes (e.g., equidistant in pairs from the center point). This symmetry and orthogonality ensure strain-matched locations for the thermistors because the applied stresses are balanced about the center point.

In response to a thermal gradient in the z axis and absence of a lateral thermal gradient applied by lateral heat sources (and assuming no strain or other effects), thermistors 412a and 412b will have a similar response, since each is located at an equivalent location below their respective anchoring regions 406a and 406b. Similarly, in the absence of a lateral thermal gradient applied by lateral heat sources (and assuming no strain or other effects), the only source of heat transfer to thermistors 412c and 412d is the in-plane temperature distribution within the CMOS layer 404 due to heat dispersion from anchoring regions 406a and 406b in response to the z-axis thermal gradient. Because the thermistors 412c and 412d are equidistant from the anchoring regions 406a and 406b (as well as the thermistors 412a and 412b), they will have a similar response due to the in-plane temperature distribution from the anchoring regions. In this manner, the output at the thermistors 412a-412d due to the z-axis thermal gradient may be additive based on the relative placement of the thermistors 412a-d (e.g., two under the anchoring regions, two remote from the anchoring regions, with the thermistors balanced and equidistant about a center point between the anchoring regions and aligned along orthogonal axes about center point).

In the presence of a lateral thermal gradient within the CMOS layer 304/404 due to a lateral heat source, the lateral thermal gradient may disperse through the CMOS layer 404 within the plane of the thermistors in the x-direction and/or y-direction based on the location of the heat source. For example, the presence of a heat source along the right-hand side (i.e., in the positive x direction) and a cold source along the left-hand side (i.e., in the negative x direction) of the CMOS layer 404 may disperse heat from left to right as depicted by thermal gradient TGx in FIG. 4, with zero relative temperature change at 418, with the temperature change sensed by the thermistors 412a and 412b being equal and opposite in magnitude, with relatively smaller temperature changes at each of thermistors 412c, and 412d (also equal and opposite) due to the thermal gradient TGx.

Heat sources resulting in a lateral heat gradient may also be applied from the top or bottom side of the CMOS layer 404 (i.e., from the positive y direction or negative y-direction). For example, a heat source along the bottom side of the CMOS layer 404 and a cold source at the top of the CMOS layer 404 may disperse heat from bottom to top as depicted by thermal gradient TGy in FIG. 4, with the temperature change sensed by the thermistors being greatest at thermistor 412d and 412c (equal and opposite in magnitude) with relatively smaller temperature changes sensed at each of thermistors 412a, and 412b, due to the thermal gradient TGy.

Lateral thermal gradients may also be applied in both the x direction and y direction at the same time, for example, from multiple heat sources located adjacent to the CMOS layer 404 of the MEMS accelerometer or a point heat source that distributes in multiple directions. However, in all instances the lateral thermal gradients from adjacent heat sources (e.g., with the exception of lateral thermal gradients from dispersion of heat from the anchoring region) may be applied at a side of the CMOS layer 404 and then disperse throughout the CMOS layer in a manner that results in differential temperature changes between the thermistors 412a-412d. In contrast, as a result of the relative locations of the thermistors 412a-412d, a z-axis thermal gradient applied to the anchoring region will result in equivalent increases in temperature at thermistors 412a and 412b and at thermistors 412c and 412d, respectively. Accordingly, the relative temperature sensed by the different thermistors 412a-412d may be used to distinguish changes in temperature due to z-axis thermal gradient (i.e., evidenced by equivalent temperature changes at the thermistors) and changes in temperature due to lateral thermal gradients (i.e., evidenced by differing changes in temperature at the thermistors based on the location of the lateral heat source).

In an exemplary embodiment, temperature outputs from the thermistors may be processed using a bridge configuration, specifically a Wheatstone bridge configuration, as will be discussed further in the description for FIG. 5. The exemplary configuration of FIG. 5, when used with thermistors located as described herein and depicted in FIGS. 3-4, may enable the accurate measurement of a vertical thermal gradient (e.g., a Vout value 512) while rejecting effects of strain and lateral thermal gradients from adjacent heat sources.

Figure 5:
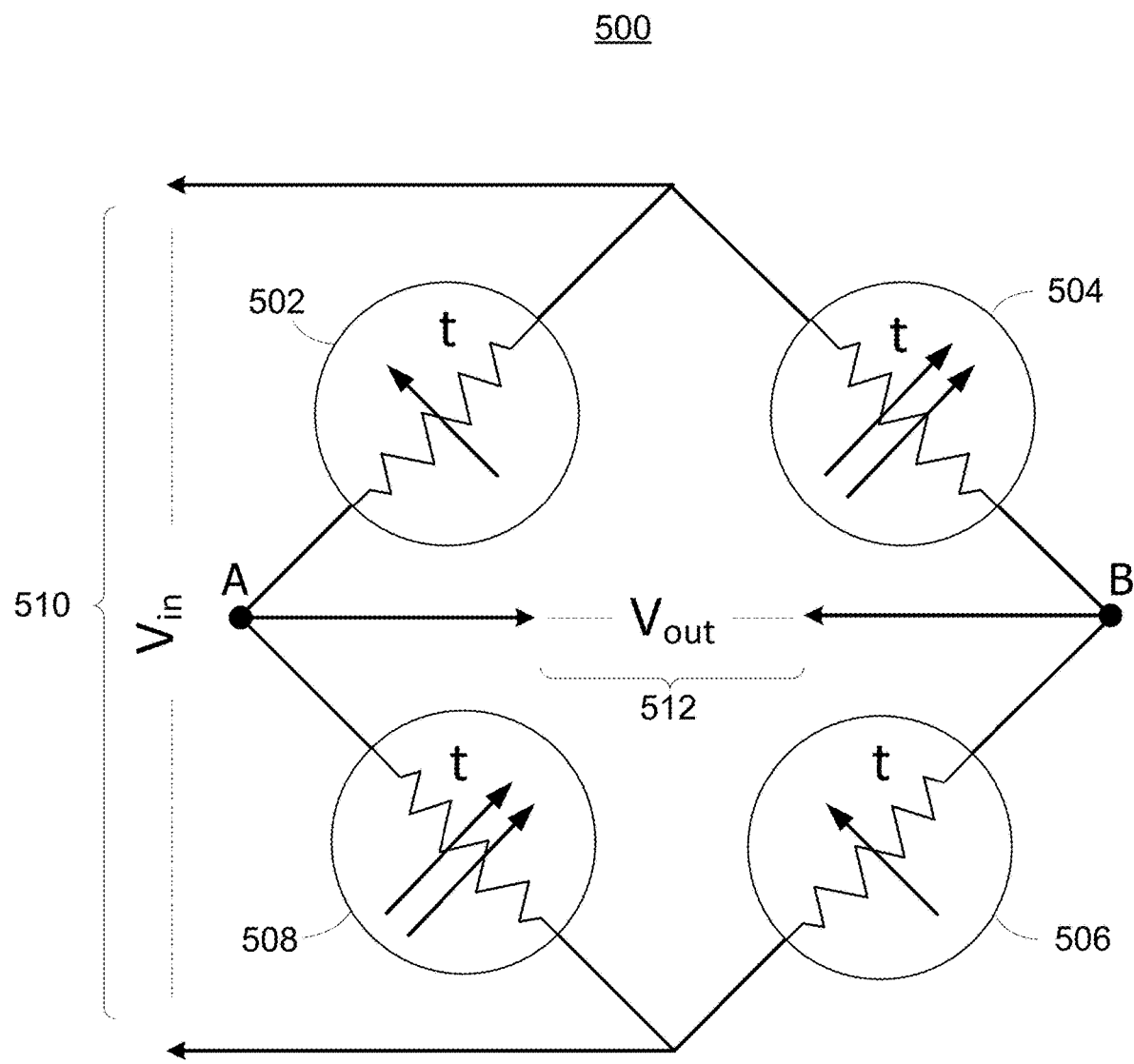
FIG. 5 shows an illustrative temperature measurement circuit in accordance with some embodiments of the present disclosure.

FIG. 5 shows illustrative temperature measurement configuration 500 in accordance with some embodiments of the present disclosure. Temperature measurement configuration 500 arranges thermistors 502, 504, 506, and 508 in a Wheatstone bridge configuration. Because the resistance of thermistors is temperature-dependent, measuring the resistances at the thermistors provides an estimate of the corresponding temperatures. Voltage 510, a known voltage Vin, is applied to the Wheatstone bridge and voltage 512, a measured voltage Vout, is used to determine an output that changes in proportion to the z-axis thermal gradient applied at the anchoring regions.

Consider four resistances $R_{502}$, $R_{504}$, $R_{506}$, and $R_{508}$ corresponding to four thermistors 502, 504, 506, and 508 at temperatures $t_{502}$, $t_{504}$, $t_{506}$, and $t_{508}$, respectively. Resistances $R_{502}$, $R_{504}$, $R_{506}$, and $R_{508}$ are proportional to temperatures $t_{502}$, $t_{504}$, $t_{506}$, and $t_{508}$ according to the design of the thermistors. Accordingly, variations in temperature result in changes to resistance, which in turn, changes the output voltage. Thus, the output voltage 512 (Vout) is equal to the difference between voltage at the node A between thermistor 502 and thermistor 508 (i.e., input voltage Vin*$R_{502}/(R_{502}+R_{508})$ the voltage at the node B between thermistor 504 and thermistor 506 (i.e., input voltage Vin*$R_{504}/(R_{506}+R_{504})$).

In an embodiment of the present disclosure, thermistor 502 may correspond to thermistors 312c/412c, thermistor 506 may correspond to thermistors 312d/412d, thermistor 504 may correspond to thermistor 312b/412b, and thermistor 508 may correspond to thermistor 312a/412a. In response to no temperature gradient, all of the thermistors (e.g., assuming that the thermistors have identical values and temperature responses) should be at the same temperature and thus will have identical resistances. The voltage at node A will be one half of the input voltage Vin, as will the voltage at node B. Thus, the output voltage Vout will be zero. When a z-axis thermal gradient is applied to the anchoring regions, the thermistors located below the anchoring regions (e.g., thermistors 504 and 508) may experience a substantial change (e.g., decrease) in resistance due to exposure to the thermal gradient, while the change (e.g., reduction) in resistance of the thermistors located away from the anchoring regions (i.e., thermistors 502 and 506) may be significantly less substantial. Thus, the voltage at node A will increase due to the $R_{502}$ having a relatively large value as compared to $R_{508}$ while the voltage at node B will decrease due to the $R_{506}$ having a relatively large value as compared to $R_{504}$. Because thermistors 504 and 508 change resistance in the same manner, and thermistors 502 and 506 change resistance in the same manner, the increase in the voltage at node A and the decrease in the voltage at node B are proportional. In this manner, Vout increases as the vertical thermal gradient increases and reduces to zero as the vertical thermal gradient decreases.

The thermistor configuration of FIGS. 3-4 and their processing in the Wheatstone bridge of FIG. 5 may also reject lateral thermal gradients due to adjacent heat sources. For example, if a heat source is applied at the left side of the CMOS layer 304/404 of FIGS. 3-4 in the direction indicated by TGx, the temperature at each of the thermistors 502-508 will increase, but in different proportions. For example, the temperature of thermistor 504 (corresponding to thermistor 312a/412a) will feature the greatest change in resistance (e.g., a decrease resulting from the greatest relative increase in temperature), the temperature of thermistor 506 (corresponding to thermistor 312c/412c) will feature the second greatest change in resistance (e.g., a decrease resulting from the second greatest relative increase in temperature), the temperature of thermistor 502 (corresponding to thermistor 312d/412d) will feature the third greatest change in resistance (e.g., a decrease resulting from the third greatest relative increase in temperature), and the temperature of thermistor 508 (corresponding to thermistor 312b/412b) will feature the least change in resistance (e.g., a decrease resulting from the least relative increase in temperature). Because the x-axis distance between thermistor 504 and thermistor 506 is the same as the x-axis distance between thermistor 502 and thermistor 508, the relative change in resistance of thermistor 504 compared to thermistor 506 is the same as the relative change in resistance of thermistor 502 compared to thermistor 508 (i.e., with thermistor 504 and 502 experiencing proportionally larger changes in resistance compared to thermistor 502 and 508). Thus, while the voltages at nodes A and B change as a result of the lateral thermal gradient, they change in the same manner such that Vout remains zero. The thermistor configuration of FIG. 5 similarly rejects lateral thermal gradients along the y-axis (e.g., applied to the top or bottom side of the CMOS layer 304/404).

Figure 6:
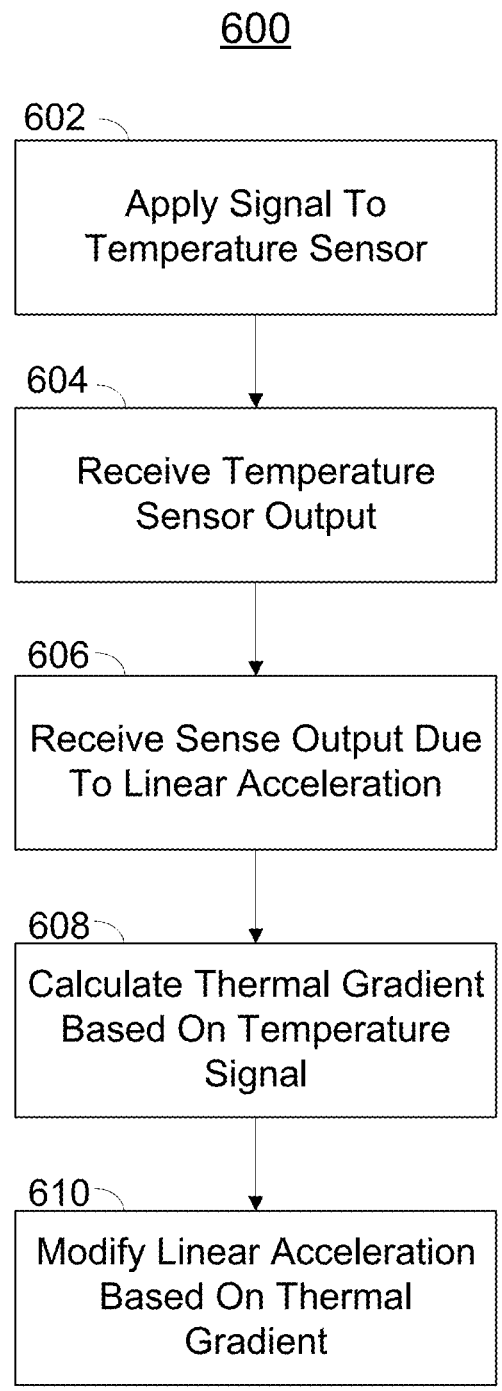
FIG. 6 depicts an illustrative flowchart of a process for modifying linear acceleration based on measured thermal gradient in accordance with some embodiments of the present disclosure.

FIG. 6 depicts an illustrative flowchart of process 600 for modifying linear acceleration based on measured thermal gradient in accordance with some embodiments of the present disclosure.

In step 602, the system applies a signal to the thermistors. The signal may be a combination of thermal gradients in X, Y and Z directions. Control circuitry may instruct an interface such as general-purpose input/output (GPIO), analog out, or digital out to provide the voltage to the bridge configuration.

In step 604, the system receives the temperature sensor output. The output received may be voltage 512, Vout, that is measured across the two nodes of the bridge configuration as shown in FIG. 5. In some embodiments, the thermistor output may be received at the processing circuitry to perform the calculations as described in step 608 below.

In step 606, the system receives a sense output due to linear acceleration. Sense circuitry of the MEMS accelerometer senses changes in capacitance in response to the movement of the proof masses (e.g., proof masses 310a and 310b moving relative to fixed electrodes 308a-d), and the changes in capacitance are processed by to the processing circuitry to determine linear acceleration.

In step 608, the system calculates the thermal gradient based on the temperature signal measured in step 604. As described herein, the value for Vout may be proportional to a z-axis thermal gradient, increasing as the z-axis thermal gradient increases. The value for Vout may reject lateral thermal gradients due to adjacent heat sources.

In step 610, the system modifies the linear acceleration measurement based on the thermal gradient calculated in step 608. Processing circuitry may use the calculated thermal gradient of step 608 to correct for the effects of the thermal gradient captured on the acceleration measurements captured by the sense output of step 606. In some embodiments, a calibration look-up table may be used to determine the appropriate modification of the sense outputs of step 606 in response to the calculated thermal gradients. For example, a calculated out-of-plane thermal gradient of 1 μK/m may have been associated with a known offset of linear acceleration, as determined during design, testing, or calibration of the MEMS accelerometer calibration. The output acceleration value may be adjusted based on the sensed thermal gradient, such as by adding or subtracting an amount of offset associated with the thermal gradient or adjusting a scaling factor in proportion to the thermal gradient.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical (MEMS) accelerometer for measuring linear acceleration along a measurement axis, comprising:
a MEMS layer having a bottom planar surface;
a CMOS layer having an upper planar surface parallel to the bottom planar surface of the MEMS layer, wherein a gap is defined between the upper planar surface of the CMOS layer and the bottom planar surface of the MEMS layer;
a first anchor located within the gap and attached to each of the MEMS layer and the CMOS layer, wherein the attachment of the first anchor to the CMOS layer defines a first anchoring region;
a second anchor located within the gap and attached to each of the MEMS layer and the CMOS layer, wherein the attachment of the second layer to the CMOS layer defines a second anchoring profile;
four temperature sensors located within a first plane within the CMOS layer, comprising:
a first temperature sensor located below the first anchoring region, wherein the first plane is perpendicular to the measurement axis;
a second temperature sensor located below the second anchoring region, wherein the first temperature sensor and the second temperature sensor are located along a first axis and are equidistant from a center point along the first axis;
a third temperature sensor located at a location that is not under either the first anchoring region or the second anchoring region;
a fourth temperature sensor located at a location that is not under either the first anchoring region or the second anchoring region, wherein the third temperature sensor and the fourth temperature sensor are located along a second axis that is orthogonal to the first axis and are equidistant from the center point; and
processing circuitry configured to:
generate a first signal in response to a thermal gradient perpendicular to the first plane by combining outputs of the first temperature sensor, second temperature sensor, third temperature sensor, and fourth temperature sensor;
generate a second signal including a first component corresponding to movement of a portion of the MEMS layer along the measurement axis relative to the CMOS layer in response to the thermal gradient and a second component corresponding to movement of the portion of the MEMS layer along the measurement axis relative to the CMOS layer in response to linear acceleration along the measurement axis; and
generate a linear acceleration output signal based on the first signal and the second signal, wherein the first signal compensates for the first component of the second signal such that the linear acceleration corresponds to the second component of the second signal.

2. The MEMS accelerometer of claim 1, wherein the linear acceleration output signal is not responsive to a thermal gradient parallel to the first plane.

3. The MEMS accelerometer of claim 1, wherein the linear acceleration output signal is not responsive to strain effects on the first, second, third, and fourth temperature sensors within the first plane.

4. The MEMS accelerometer of claim 1, wherein the first, second, third, and fourth temperature sensors are configured in a Wheatstone bridge, and wherein the processing circuitry is coupled to the first, second, third, and fourth temperature sensors via the Wheatstone bridge.

5. The MEMS accelerometer of claim 4, wherein the Wheatstone bridge comprises two input nodes and two output nodes, wherein the first temperature sensor and the third temperature sensor are coupled to a first input node of the two input nodes and wherein the second temperature sensor and the fourth temperature sensor are coupled to a second input node of the two input nodes.

6. The MEMS accelerometer of claim 5, wherein the first temperature sensor and the fourth temperature sensor are coupled to a first output node of the two output nodes and wherein the second temperature sensor and the third temperature sensor are coupled to a second output node of the two output nodes.

7. The MEMS accelerometer of claim 6, wherein a first response of the first temperature sensor to a change in temperature and a second response of the second temperature sensor to the change in temperature are substantially identical.

8. The MEMS accelerometer of claim 7, wherein a third response of the third temperature sensor to the change in temperature and a fourth response of the fourth temperature sensor to the change in temperature are substantially identical.

9. The MEMS accelerometer of claim 8, wherein the first response, second response, third response, and fourth response are substantially identical.

10. The MEMS accelerometer of claim 1, wherein each of the plurality of temperature sensors comprises a thermistor.

11. The method of measuring linear acceleration along a measurement axis for a microelectromechanical (MEMS) device, comprising:
receiving, from a first temperature sensor located in a CMOS layer below a first anchoring region, a first temperature signal, wherein a first anchor defines the first anchoring region and is coupled between the CMOS layer and a MEMS layer within a gap between the CMOS layer and the MEMS layer;
receiving, from a second temperature sensor located in the CMOS layer below a second anchoring region, a second temperature signal, wherein a second anchor defines the second anchoring region is coupled between the CMOS layer and the MEMS layer within the gap between the CMOS layer and the MEMS layer;
receiving, from a third temperature sensor located at a first location that is not under either the first anchoring region or the second anchoring region, a third temperature signal;
receiving, from a fourth temperature sensor located at a second location that is not under either the first anchoring region or the second anchoring region, a fourth temperature signal;
generating a first output signal in response to a thermal gradient perpendicular to a first plane by combining outputs of the first temperature sensor, second temperature sensor, third temperature sensor, and fourth temperature sensor, wherein the first temperature sensor, second temperature sensor, third temperature sensor, and fourth temperature sensor are located within a first plane within the CMOS layer;
generating a second output signal corresponding to movement of a portion of the MEMS layer along the measurement axis relative to the CMOS layer in response to the thermal gradient and a second component corresponding to movement of the portion of the MEMS layer along the measurement axis relative to the CMOS layer in response to linear acceleration along the measurement axis; and
generating a linear acceleration output signal based on the first signal and the second signal, wherein the first signal compensates for the first component of the second signal such that the linear acceleration corresponds to the second component of the second signal.

12. The method of claim 11, wherein the linear acceleration output signal is not responsive to a thermal gradient parallel to the first plane.

13. The method of claim 11, wherein the linear acceleration output signal is not responsive to strain effects on the first, second, third and fourth temperature sensors within the first plane.

14. The method of claim 11, wherein the first, second, third and fourth temperature sensors are configured in a Wheatstone bridge, and wherein the processing circuitry is coupled to the first, second, third and fourth temperature sensors via the Wheatstone bridge.

15. The method of claim 14, wherein the Wheatstone bridge comprises two input nodes and two output nodes, wherein the first temperature sensor and the third temperature sensor are coupled to a first input node of the two input nodes and wherein the second temperature sensor and the fourth temperature sensor are coupled to a second input node of the two input nodes.

16. The method of claim 15, wherein the first temperature sensor and the fourth temperature sensor are coupled to a first output node of the two output nodes and wherein the second temperature sensor and the third temperature sensor are coupled to a second output node of the two output nodes.

17. The method of claim 16, wherein a first response of the first temperature sensor to a change in temperature and a second response of the second temperature sensor to the change in temperature are substantially identical.

18. The method of claim 17, wherein a third response of the third temperature sensor to the change in temperature and a fourth response of the fourth temperature sensor to the change in temperature are substantially identical.

19. The method of claim 18, wherein the first response, second response, third response, and fourth response are substantially identical.

20. The method of claim 11, wherein each of the plurality of temperature sensors comprises a thermistor.

* * * * *